Dec. 26, 1944.                G. F. HANDLEY                2,366,024
                            TYPEWRITING MACHINE
                           Filed March 24, 1943        5 Sheets-Sheet 2
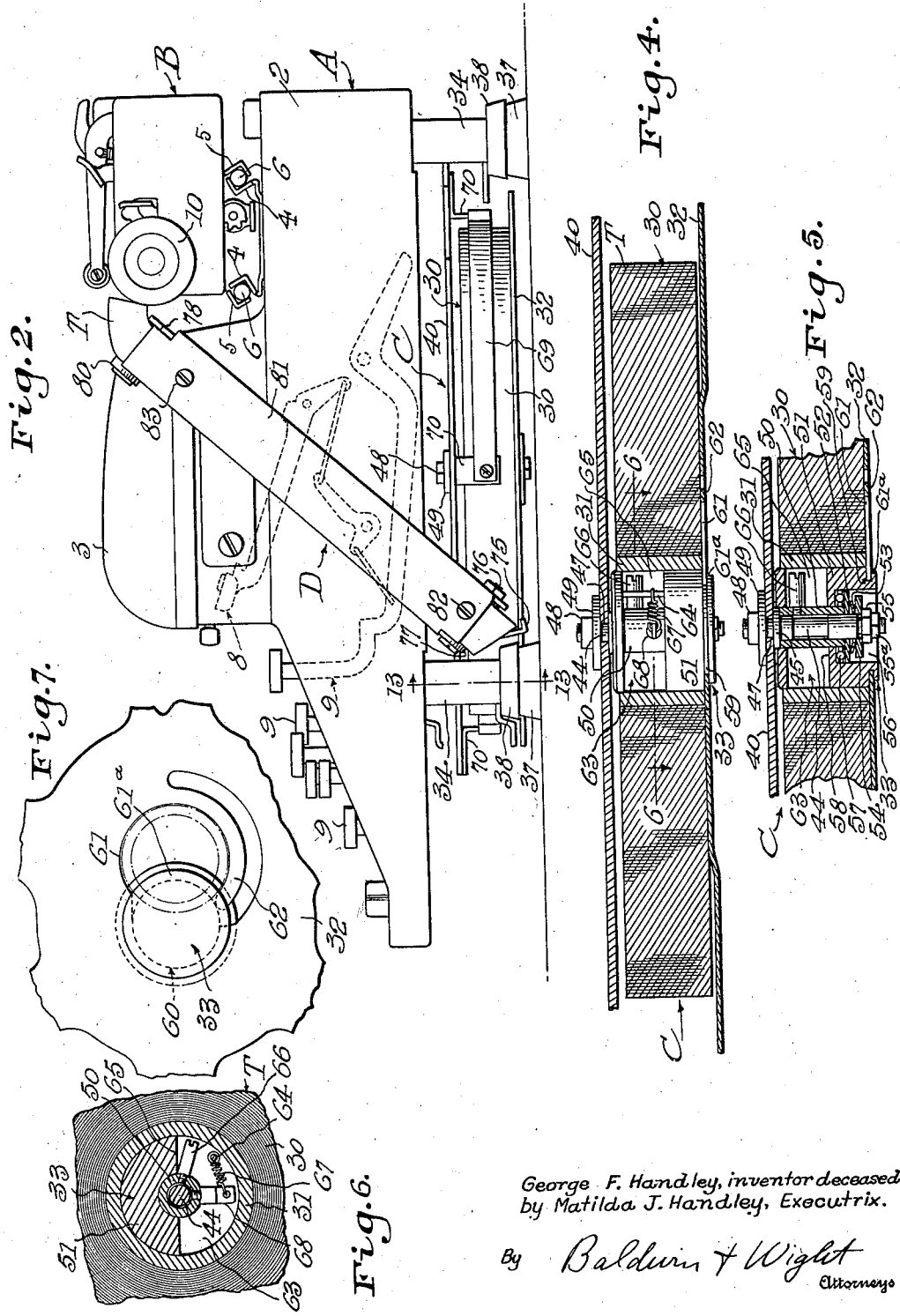
George F. Handley, inventor deceased,
by Matilda J. Handley, Executrix.
By Baldwin & Wight
                        Attorneys

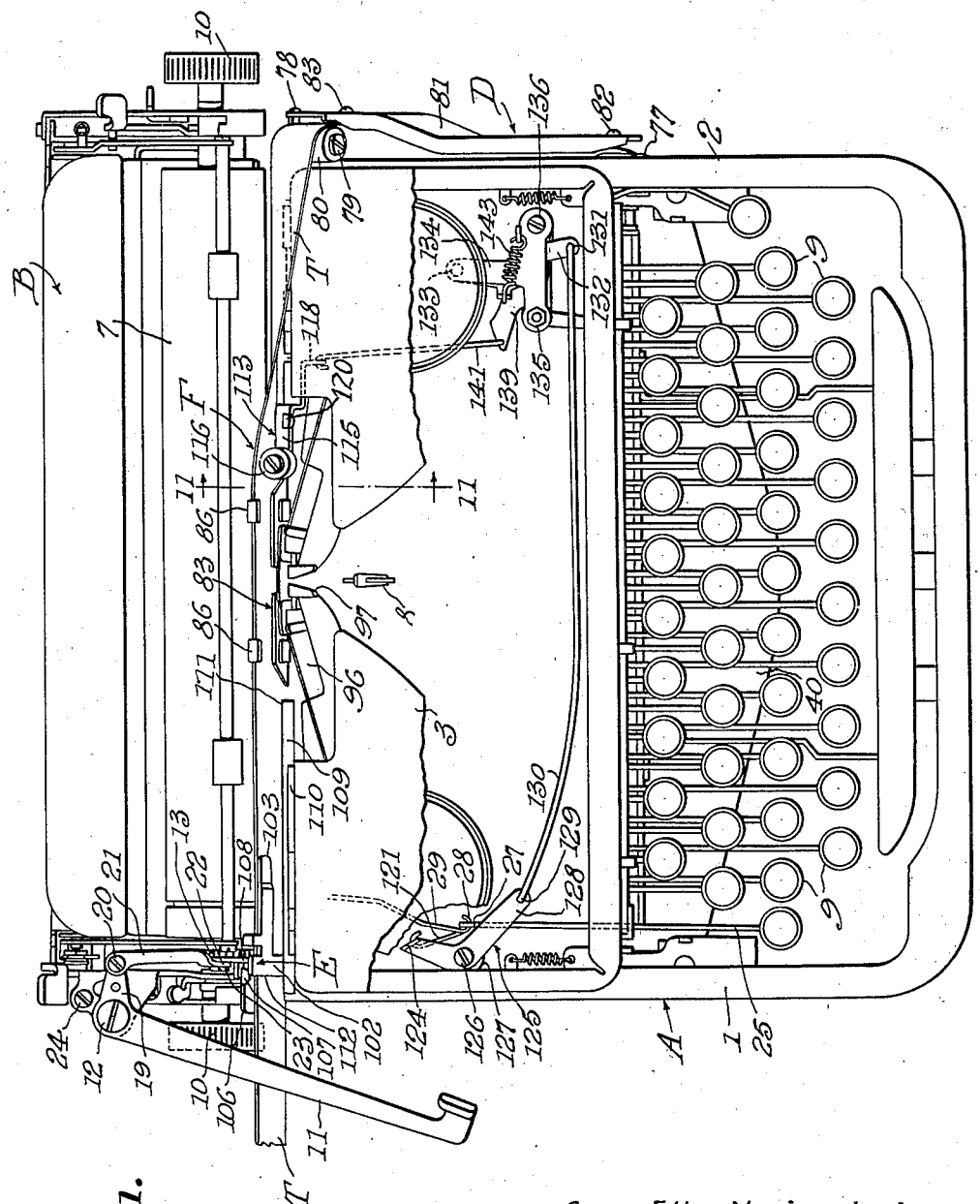

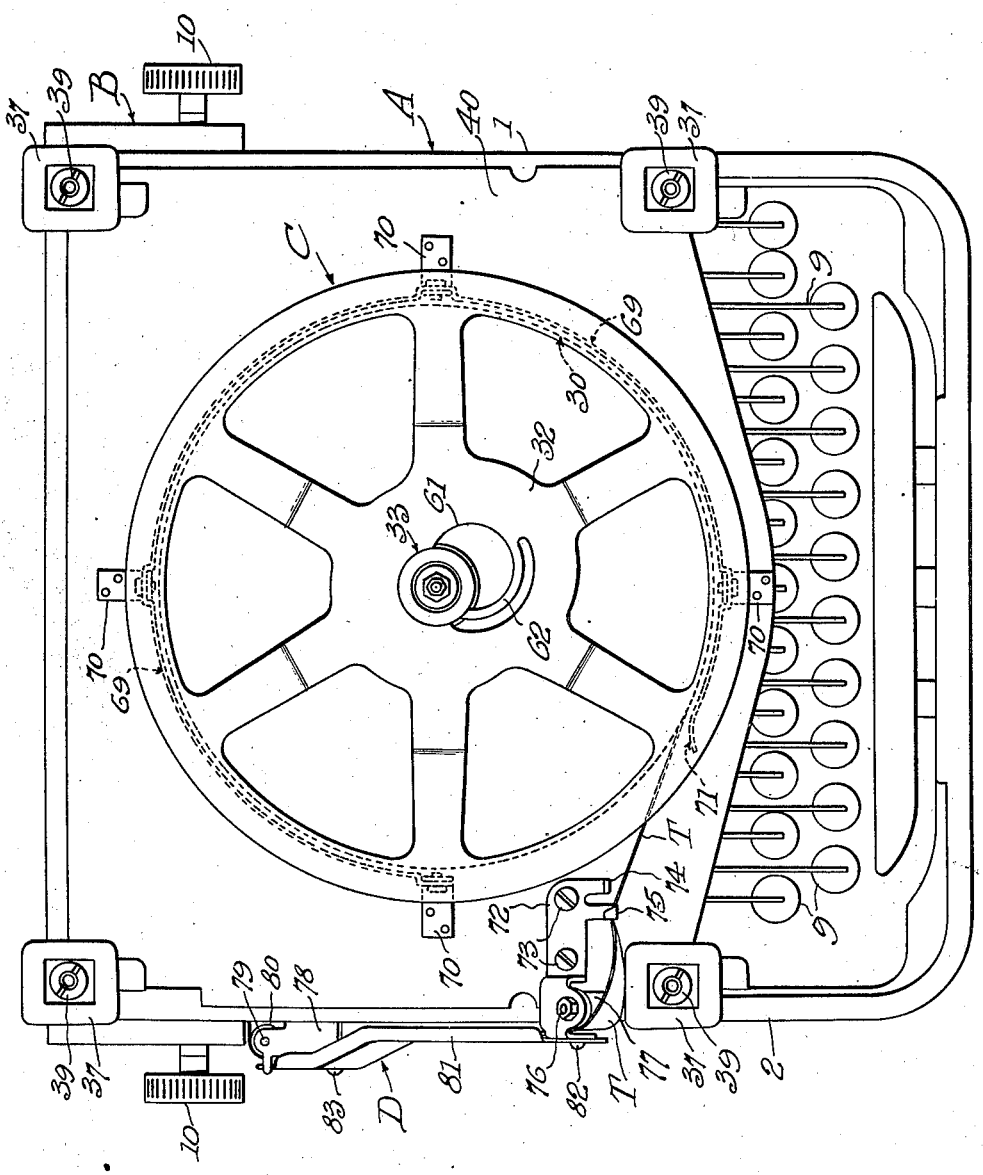

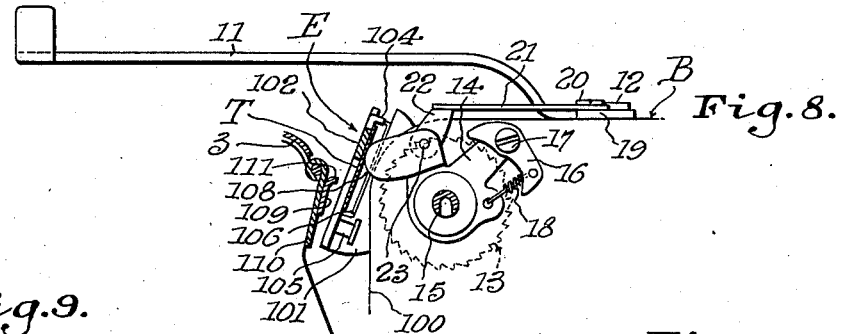
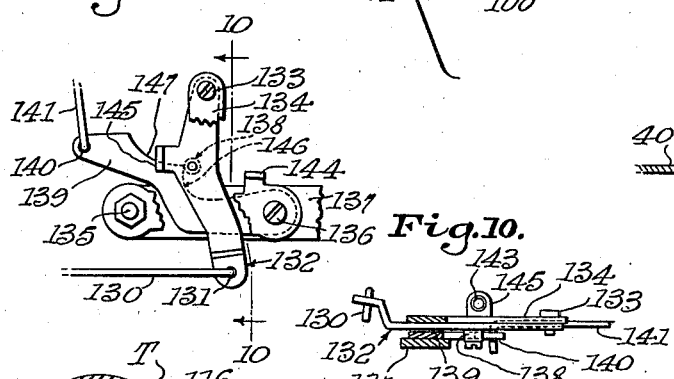
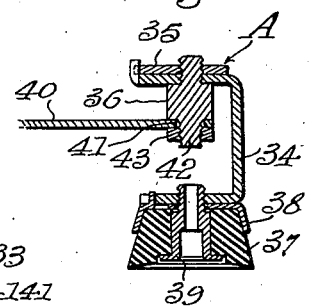
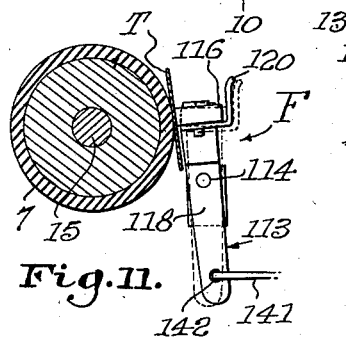
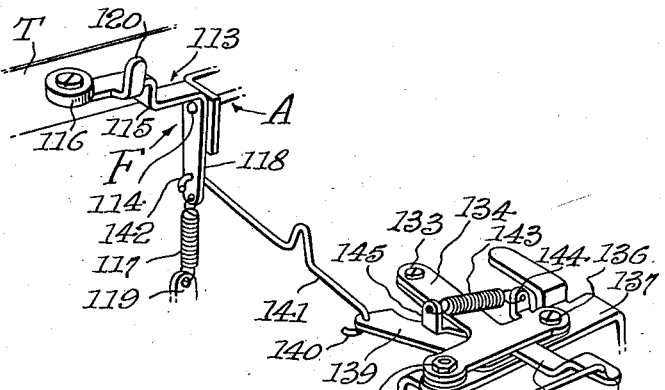
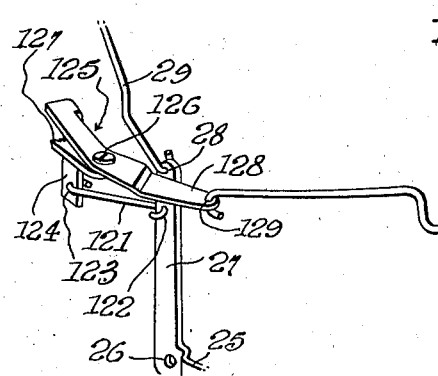
George F. Handley, inventor deceased, by Matilda J. Handley, Executrix.

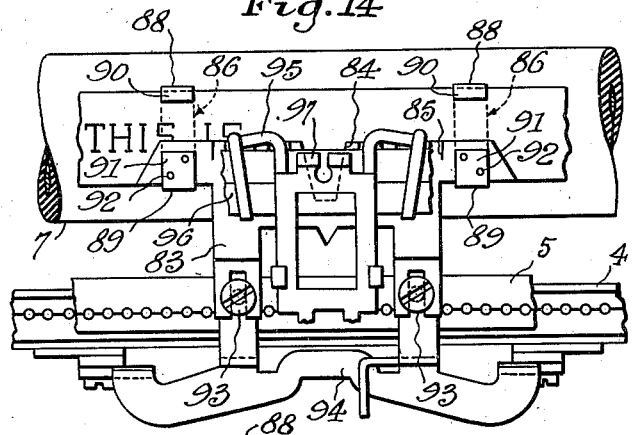
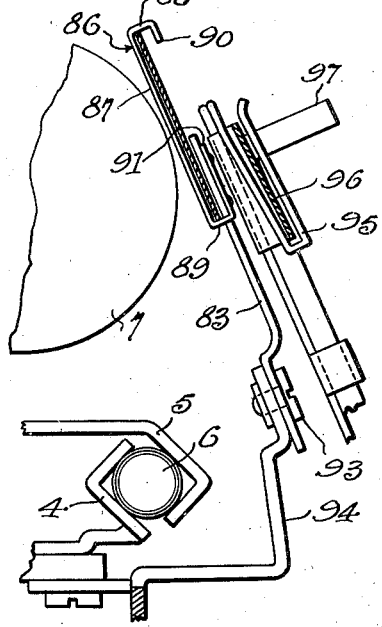
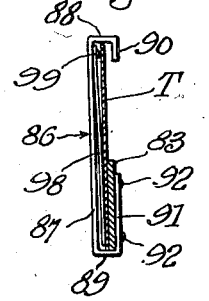
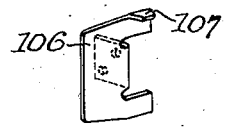
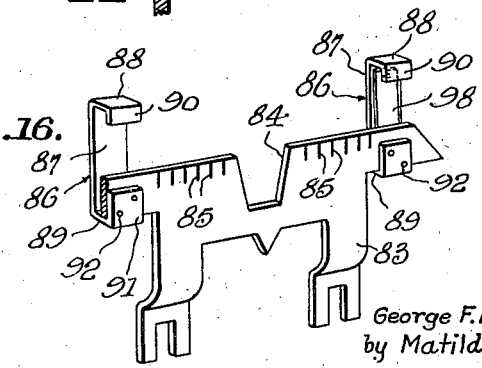
George F. Handley, inventor deceased, by Matilda J. Handley, Executrix.

Patented Dec. 26, 1944

2,366,024

UNITED STATES PATENT OFFICE 2,366,024

TYPEWRITING MACHINE

George F. Handley, deceased, late of Glendale, N. Y., by Matilda J. Handley, executrix, Yonkers, N. Y., assignor to Royal Typewriter Company, Inc., New York, N. Y., a corporation of New York Application March 24, 1943, Serial No. 480,369

24 Claims. (Cl. 197—133)

This invention relates to typewriting machines, and more particularly to typewriting machines equipped or adapted for writing on ribbons or tapes, as is commonly done in the sending and receiving of telegrams.

An object of the invention is to provide an improved arrangement for the mounting of a supply of type-impression-receiving tape or ribbon on typewriting machines.

Another object is to provide a tape or ribbon mounting of the character stated and which is adapted to be mounted on a typewriter, especially a portable typewriter, below the key lever and associated mechanism so as to be assembled compactly with the typewriter, thus enabling the whole assembly to be accommodated in a small space, for example the space normally provided in a typewriter carrying case.

Another object is to provide a new and improved mechanism for applying proper tension to a tape or ribbon held in position to receive type impressions.

Another object is to provide mechanism for moving such a tape reversely in response to a tendency for the tape to slacken, to take up the tape slack and maintain the tape taut in writing position.

Another object is to provide means for moving the tape reversely to its direction of writing or feeding movement as an incident to back spacing of the typewriter carriage or platen travel.

Another object is to provide means for connecting the tape to the carriage or platen at a point short of the writing zone during or in response to back spacing of the carriage or platen.

Another object is to provide a tape supply control means including a hub unit adapted to impose a frictional drag on normal feeding of the tape and to turn reversely to take up slack in the tape.

A further object of the invention is to provide a simple but effective combined tape guide and tension creating device.

Other objects will become apparent from a reading of the following description, the appended claims, and the accompanying drawings, in which:

Figure 1 is a top plan view of a typewriter equipped with mechanism embodying the invention;

Figure 2 is an end elevation of the typewriter shown in Figure 1;

Figure 3 is a bottom plan view of the typewriter shown in Figures 1 and 2;

Figure 4 is a fragmentary vertical, sectional view of a supplemental frame plate and tape supply roll equipment mounted thereon, a hub unit for mounting the tape roll being shown in elevation;

Figure 5 is a view similar to Figure 4 but showing the hub unit in vertical section;

Figure 6 is a fragmentary horizontal sectional view on the line 6—6 of Figure 4;

Figure 7 is a fragmentary bottom plan view of a tape roll flange constructed to be detachably connected to the hub unit shown in Figures 4, 5, and 6;

Figure 8 is a fragmentary vertical sectional view showing line spacing mechanism and parts associated therewith;

Figure 9 is a fragmentary top plan view on an enlarged scale showing cam mechanism for operating a tape pressing element in response to actuation of carriage back spacing means;

Figure 10 is a detail section on the line 10—10 of Figure 9;

Figure 11 is a fragmentary vertical section on the line 11—11 of Figure 1 showing a platen, a type-impression receiving tape, and a tape pressing element, other parts being omitted;

Figure 12 is a detached perspective view of link, lever, and cam mechanism for operating a tape presser element;

Figure 13 is a vertical sectional view of a frame extension leg, the section being taken on the line 13—13 of Figure 2;

Figure 14 is a fragmentary front elevation of a typewriter platen, card guide scale and tape guiding member and associated parts, drawn on an enlarged scale;

Figure 15 is a view partly in elevation and partly in section showing on an enlarged scale the relative positions of a platen, a type-impression receiving tape, and ink ribbon mechanism;

Figure 16 is a perspective view, partly in section, showing the mounting of tape finger guides on a card guide scale;

Figure 17 is a vertical section of a card guide scale showing a tape and finger guide and tensioning device in elevation; and Figure 18 is a detail perspective of a tape retainer plate.

Mechanism embodying the invention may be incorporated in typewriting or like machines of various kinds. For the purposes of illustration the invention is disclosed as being embodied in a typewriter having the general organization of parts and features of the Royal Portable machine. The typewriter includes a main frame A which, with the mechanism supported thereon, is adapted to be housed in a carrying case of any suitable kind. The frame A comprises end walls 1 and 2 and a mask or cover 3 all of known construction. A pair of bottom rails 4—4 supported on the main frame mounts a carriage B through the medium of carriage rails 5—5 and ball bearings 6 interposed between the respective pairs of rails 4 and 5, the carriage being thus mounted for letter spacing and return movements endwise of the frame. Mounted in the usual manner on the carriage B is a cylinder or platen 7. The usual complement of type bars is provided, one type bar being shown at 8 in Figures 1 and 2. The type bars may be operated by any suitable mechanism including key levers 9. The platen is equipped with finger knobs 10—10 and the usual combined line spacing and carriage return lever 11 is pivoted on the carriage at 12.

Mechanism is provided for rotating the platen 7 upon operation of the lever 11 incident to moving the carriage in the return direction. A ratchet wheel 13 is fixed to the platen 7. A lever 14 rockable about the platen shaft 15 carries a pawl 16 pivoted on the lever 14 as at 17. The nose of the pawl 16 is urged into engagement with the ratchet wheel 13 by a spring 18. An arm 19 on the line space lever 11 is pivotally connected as at 20 to the rear end of a link 21 the forward end of which is provided with a downturned portion 22 pivoted as at 23 to the lever 14. Normally the lever 11, link 21 and lever 14 are in the positions shown in Figures 1 and 8. When the lever 11 is rocked counterclockwise as viewed in Figure 1, the lever 14 and cam 16 will be rocked clockwise as viewed in Figure 8, whereupon the pawl 16 will rotate the ratchet wheel 13 and platen 7 to line space a work sheet extending under and in front of the platen. Rocking of the lever 11 for effecting line spacing is limited by engagement of the arm 19 with a stop screw 24 on the carriage B. When the lever 11 is released by the operator, it is returned to its starting position by a spring (not shown).

Mechanism for back spacing the platen, i. e. moving it step-by-step in the return direction, includes a back spacer key 25 apertured as at 26 (see Figure 12) for being pivoted on the main frame in any conventional or suitable manner. The key 25 is formed with a vertically extending arm 27 to which is pivoted as at 28 the front end of a pull rod 29. The pull rod part 29 extends rearwardly as indicated in Figure 1 for connection to mechanism (not shown) which is operable in response to a single forward movement of the pull rod 29 for back spacing or moving the carriage and platen in the return direction an amount equal to one letter space.

With the exception of some features of construction of the lever 14 which will be described hereinafter, the parts referred to thus far are usual or conventional equipment in machines of the character referred to. Other conventional parts will be referred to as the description proceeds and still others not referred to specifically in the description will be recognized as being shown in the drawings.

In its general nature, the tape feeding equipment shown as embodying the invention in one preferred form includes a tape supply means generally designated C, means generally designated D for training or directing tape from the supply means C along the printing line of the platen 7, mechanism E for connecting the tape to the platen to travel therewith, and mechanism generally designated F for pressing the tape against the platen during back spacing movement of the latter. Tape is led from the supply means C through and beyond the guide means D so as to extend along the printing line of the platen to the mechanism E which is located beyond the printing zone and preferably at the left hand end of the carriage B. During the typing of a line, the tape is connected to the platen by means of the mechanism E so that as the platen travels in the letter spacing direction tape will be pulled along with the platen past the printing zone, thereby being fed in the letter spacing direction at a rate exactly corresponding to the rate of platen travel. During the writing of a line, the tape is subjected to a frictional drag tending to maintain it taut along the writing line. In addition to the frictional drag, a retracting force is imposed on the tape at a point short of the printing zone so that if the carriage and platen are moved in the return direction while the tape is still connected to the platen by the mechanism E, the tape will bodily be pulled backwardly by the retracting force, thus preventing the tape from buckling in front of the platen.

When the carriage is to be returned to line starting position, operation of the line spacing lever 11 causes the mechanism E to release the tape so that the tape can remain stationary along the printing line. When the line spacing lever 11 is released after the carriage has been returned to line starting position, the mechanism E will re-connect the tape to the platen. It is desirable that tape extending along the writing line be moved together with the carriage when the carriage is back spaced by operation of the key 25. For accomplishing this mechanism E maintains the tape connected to the platen so as to move therewith during back spacing operation. Preferably also during such back spacing operation, the tape is connected to the platen by the mechanism F. The mechanism F is rendered effective for connecting the tape to the platen by operation of the key 25 when the latter is depressed to effect the back spacing of the carriage and platen.

The type impression receiving tape is relatively thick as compared to carbon paper ribbon often used in roll form in connection with manifolding work. Consequently in order to provide a tape supply which will last for a substantial time without requiring frequent replenishment, the supply necessarily is somewhat bulky. One feature of the present invention is to provide for the mounting of a large and somewhat bulky tape supply so that it may be positioned for convenient feeding, and it also is adapted to be mounted compactly with respect to the typewriter so as to permit the typewriter and the tape supply to be readily housed or enclosed in a carrying case. In accordance with the present invention, the supply means C is mounted underneath the frame A and the mechanism supported thereon.

In the form shown, the supply means C includes a roll 30 of paper type-impression-receiving tape T wound on a core 31 and adapted to be supported on a flange 32 carried by a self-contained hub unit 33 suspended from the frame A. The thickness or height of the supply means C is greater than the clearance normally provided between a conventional typewriter and the surface on which it is supported and in order to provide the space needed for accommodating the supply means C, the frame A is equipped with extension legs 34. These legs are channel shaped with their top flanges underlying a bottom flange 35 on the frame A and being clamped thereto by double-ended screws 36. The bottom flanges of the legs 34 are equipped with rubber supporting feet 37 and cups 38 held in place by screws 39.

The legs 34 hold the typewriter high enough to provide a space underneath the frame A and typewriter mechanism it carries for accommodating the supply means C snugly. A supplemental frame plate 40 mounted within the space thus provided is formed with apertures 41 which fit over the lower threaded ends 42 of the double ended screws 36, nuts 43 holding the plate 40 in position. The plate 40 serves as a support for a journal pin 44 formed with a flange 45 abutting the lower face of the plate 40. The outer end of the pin 44 extends through an aperture 47 in the plate 40 and is threaded to receive a nut 48 which presses against a washer 49 to hold the latter against the plate 40 and thereby secure the pin 44 to the plate.

The hub unit 33 includes an inner sleeve device 50 and an outer sleeve device 51, both of which are mounted for rotation about the axis of the journal pin 44. The inner sleeve 50 is pressed into abutting engagement with the pin flange 45 by a washer 52 which is urged upwardly by a cup spring washer 53 loaded by another washer 54 held in place by a nut 55 prevented from accidental displacement by a lock nut 55ª. The spring washer 53 causes the washer 52 to press on the lower end of the inner sleeve 50 with sufficient force to cause rotation of the sleeve 50 to be opposed by a substantial frictional resistance or drag. Turning the nut 55 to different positions of adjustment serves to vary the pressure loading on the spring cup washer 53, thus varying the frictional drag opposing rotation of the tape supply means C.

The outer sleeve device 51 is recessed as at 56 to accommodate the nuts 55 and 55ª, the washer 54 and the spring cup washer 53, the washer 52 and also a ball bearing assembly 57 which is interposed between the washer 52 and a flange 58 integral with the outer sleeve 51. The outer sleeve 51 thus is supported on the ball bearings 57 and is freely rotatable about the axis of the journal pin 44.

The outer sleeve 51 is adapted to detachably mount the tape roll core 31 and roll supporting flange 32. To this end the sleeve 51 is formed with a peripheral groove 59 adapted to receive the portion of the flange 32 which is formed with an opening 60 of the same diameter as the root of the groove 59 and with a communicating opening 61 of a diameter slightly greater than the diameter of the lip 61ª at the lower end of the sleeve 51. The arrangement is such that the larger diameter opening 61 can be passed over the lip 61ª and to the level of the groove 59, after which the flange 32 is moved horizontally to position the walls of the opening 60 within the groove 59. Preferably a curved spring finger 62 bounding a part of the opening 61 has its free end so positioned as to engage the root of the groove 59 in the sleeve 51 for releasably and yieldably maintaining the flange 32 assembled to the sleeve 51. When it is desired to replace an empty core 31 with a core wound with a full supply of tape, the flange 32 is shifted so as to bring the large diameter opening 61 into registry with the sleeve 51, whereupon the flange 32 may be moved over the lip 61ª and clear of the hub unit 33. The exhausted core 31 may then be slid axially off the hub unit and a fresh core and tape positioned over the hub unit, after which the flange 32 is replaced.

In operation, pulling of the tape along with the platen causes tape to be unwound from the roll 30, the latter rotating counterclockwise as viewed in Figure 6. The hub unit 33 is so constructed and equipped that during normal pull-off of the tape T, the roll 30 will rotate the outer sleeve 51 which in turn will rotate the inner sleeve 50 against the frictional drag or retarding action constantly imposed by the spring cup washer 53. Moreover the hub unit E is so constructed and equipped that if, after the typing of a line has been commenced, there is a tendency for the tape to slacken due to the irregular movement of the carriage, the outer sleeve 51 and the roll 30 will be rotated reversely so as to take up the tape slack and maintain the tape taut. In the form shown, the outer sleeve 51 is cut-out as at 63 and is equipped with a pin 64 extending across the cut-out portion in spaced relation to one wall 65 formed by the cut-out. A pin 66 is connected to and extends radially from the inner sleeve 50 and is adapted to engage respectively with the pin 64 and the wall 65 for limiting relative rotation between the sleeves 50 and 51. A resilient spring coupling 67 is interposed between the pin 64 and a pin 68 connected to and extending radially from the inner sleeve 50.

In operation, before the typing of a line has been commenced, the parts of the hub assembly 33 will be in the positions shown in Figure 6. When the tape is pulled off the roll 30 incident to letter spacing travel of the carriage, the outer sleeve 51 will rotate counterclockwise as viewed in Figure 6, while the inner sleeve 51 remains stationary due to the frictional drag offered to its rotation. During this movement of the outer sleeve 51 the spring 67 will be additionally tensioned. When the pin 64 engages the pin 66 on the inner sleeve 50, the latter will be rotated together with the outer sleeve 51 and tape roll 30. Consequently the frictional drag offered to rotation of the inner sleeve 50 will be effective for opposing rotation of the outer sleeve 51 and tape roll 30 and considerable force will have to be transmitted through the tape in order to cause it to unwind from the roll 30. Thus the tape will be maintained taut along the printing line. If anything occurs which tends to slacken the tape, for example a back spacing movement of the platen, the tensioned spring 67 by pulling on the pin 64 will rotate the outer sleeve 51 and roll 30 reversely so as to rewind tape on the roll 30 and take up the slack. This reverse movement of the sleeve 51 takes place while the inner sleeve 50 is stationary and is limited by engagement of the sleeve wall 65 with the stop pin 66. Although the angular retracting movement which can take place within the limit of the stops is small, the peripheral reverse movement of the roll 30 is substantial because of the appreciable diameter of the roll and is sufficient to take up the slack caused by any reasonable or normal back spacing of the platen.

Tape is drawn off the roll 30 near the front of the typewriter. Preferably a guard 69 mounted on the plate 40 by brackets 70 surrounds most of the roll 30 but is open near the front and provided there with a curved lip 71 past which the unwound portion of the tape extends to the guide means D.

The guide means D includes a bracket 72 secured to the bottom of the supplemental frame 40 by screws 73. The bracket 72 is formed with depending fingers 74 and 75 between which tape from the roll 30 extends horizontally and thence beyond the end wall 2 of the frame A. Preferably the finger 75 has its lower end turned under to support the tape against sagging. An inclined spindle 76 mounted on the bracket 72 journals a guide roller 77 over which the tape passes to extend at an inclination upwardly and rearwardly alongside the outer face of the frame wall 2. A bracket 78 mounted on the top of the frame A carries an inclined spindle 79 on which is journalled a roller 80. Tape extending upwardly and rearwardly from the lower roller 77 passes around the inclined roller 80 and thence twists slightly as indicated in Figures 1 and 2 and extends along the writing line of the platen. Preferably a guard 81 is secured to the brackets 72 and 78 respectively by screws 82 and 83 for protecting the stretch of tape extending outside the frame wall 2.

Guides for positioning the tape accurately at the printing zone, i. e. the vicinity of type bar impact on the tape, may be carried upon the usual letter spacing guide scale member 83. The member 83 is formed with a clearance opening 84 for accommodating type heads and is marked with scale divisions 85. The tape guides shown at 86 are supported on the member 83 at both sides of the clearance opening 84 so that there is only a short unsupported length of tape at and immediately adjacent the printing point. The guides 86 are of general channel shape and each includes a web 87 and top and bottom flange portions 88 and 89 having respectively inturned ends 90 and 91. The inturned end portions 91 are secured to the scale member 83 by rivets 92. As shown in Figures 14 and 15 the scale member 83 is secured by screws 93 to a frame bracket 94. The usual ribbon vibrator 95 is provided for the ink ribbon 96 and a type bar guide 97 is positioned in front of the clearance opening 84.

The right hand guide 86 is equipped with means operable upon the tape for imposing frictional resistance to tape feeding at a point short of but immediately adjacent the printing zone. As shown in Figures 16 and 17, a spring finger 98 riveted to the right hand guide 86 as at 99 extends down behind the scale member 83. The tape passes between and is resiliently clamped by the spring finger 98 and scale guide 83 so as to be subjected to a slight frictional drag in addition to that due to the frictional resistance to rotation of the roll 30 and hub unit 33.

The tape extends from the left hand guide 86 to the mechanism E which is adapted to connect the tape to the platen for travel therewith during letter spacing movement. As shown in Figure 8, the left hand carriage end plate 100 is provided with a forwardly extending member 101 which is turned at its front to provide a tape holding part 102 parallel to the axis of the platen and inclined from the bottom rearwardly and upwardly. The part 102 is formed with a finger 103 which extends toward the printing zone in front of the platen and is adapted to engage the top edge portion of the tape and prevent it from buckling outwardly. The tape passes back of the finger 103 and tape holding part 102 and is maintained against vertical displacement by a lip 104 extending rearwardly from the top of the part 102 and a headed pin 105 extending rearwardly from the bottom of the part 102. A tape retainer plate 106 mounted on the carriage is parallel to and spaced rearwardly from the tape holding part 102, the arrangement being such that the tape is extended between the part 102 and plate 106. Preferably the plate 106 is provided with a lip 107 adapted to overhang the top edge of the tape.

When the lever 11 and associated line spacing mechanism are in their inactive positions, the rock lever 14 is in the position shown in Figure 8 and a clamping heel 108 integral with the lever 14 engages and clamps or squeezes the tape against the rear face of the tape holding part 102, thus connecting the tape to the platen 7. Consequently, when the carriage is moved in the letter spacing direction, the tape will be pulled along the writing line together with the platen, assuring the feeding of exactly the right amount of tape and proper spacing of the typed letters on the tape.

When the line spacing lever is operated to return the carriage to line starting position, the lever 14 is rocked clockwise as viewed in Figure 8, thus moving the clamping heel 108 away from the tape and disconnecting the tape from the platen. The carriage and platen can then be moved in the return direction while the tape remains stationary, the mechanism E slipping along the tape which extends freely between the clamping part 102 and the withdrawn clamping heel 108. During return movement of the carriage, the mechanism E may exert a slight incidental return drag on the tape due to the light rubbing of the parts 102, 105, and 106 against the tape, which may result in some tendency to buckle the tape forwardly. To prevent such buckling, there preferably is provided a strip 109 secured to a fixed part 110 of the frame A and having a rearwardly extending lip 111 positioned a little in front of the tape. Normally the lip 111 is not contacted by the tape, but if the tape should tend to buckle forwardly, the lip will be engaged by the tape and will maintain it against buckling of any consequence.

The mechanism E may be provided with means for facilitating the severing from the tape extending along the writing line of a tape end portion which has been typed upon and which projects to the left of the mechanism E. In the form shown, the tape clamping part 102 has an outer or left hand edge 112 so formed that by pulling the projecting portion of the tape forwardly, it may easily be severed along the edge 112.

During back spacing of the carriage and platen, as distinguished from returning them all the way to line starting position, it is necessary for the tape to be moved in the return direction together with the platen. In accordance with the present invention, the mechanism F is operative upon the tape for connecting the tape to the platen at a point short of the printing zone so as to be moved bodily with the platen during the back spacing operation. In the embodiment shown, a presser element normally out of pressing engagement with the tape is mounted adjacent the right hand tape guide 86 and is adapted to be moved into pressing engagement with the tape when the carriage and platen are back spaced. The presser element comprises a lever 113 pivoted to the frame A as at 114 and having a horizontal arm 115 equipped with a roller 116. A spring 117, interposed between a depending arm 118 of the lever 113 and a fixed frame part 119, normally and yieldably retains the lever 113 so positioned that the roller 116 does not press upon the tape. Sometimes the carriage and platen may be back spaced by pushing directly upon the carriage itself or some part carried thereby, such as one of the finger knobs 10. The lever 113 is equipped with a finger piece 120 by means of which the lever may be rocked manually to bring the roller 116 into pressing engagement with the tape during back spacing of the platen effected by direct manual pushing of the carriage in the return direction.

Frequently, however, it is desirable to back space the platen a distance corresponding to a definite number of letter spacing increments and this may be accomplished most easily by depression of the back spacer key 25. In accordance with a further feature of the invention, means are provided for moving the presser roller 116 into pressing engagement with the tape in response to depression of the back spacer key 25. For this purpose, a link 121 is pivoted as at 122 to the arm 27 of the key 25 and is pivoted as at 123 to an arm 124 of a lever 125 pivoted as at 126 on a frame mounted bracket 127. Another arm 128 of the lever 125 is pivoted as at 129 to a link 130, which is in turn connected as at 131 to a lever 132 pivoted as at 133 on a T-shaped mounting plate 134 secured by screws 135 and 136 to a frame bracket 137. The lever 132 is provided with a depending cam roller element 138 (see Figure 9) arranged to cooperate with a cam lever element 139 pivoted on the screw 136. The T-shaped plate 134 overlies the levers 132 and 139 and cooperates with the bracket 137 extending under the levers for holding the levers against vertical movement. The lever 139 is pivoted as at 140 to a link 141 in turn pivoted as at 142 to the depending arm 118 of the lever 113. A spring 143 interposed between ears 144 and 145 respectively on the plate 134 and lever 139 tends to hold the lever 139 in such position that the lever 113 will be in its inactive state with the roller 116 out of pressing engagement with the tape. As shown in Figure 9, the lever 139 is formed with a cam rise portion 146 and a cam dwell portion 147.

In operation, when the back spacer key 25 is depressed, the lever arm 27, link 121, lever 125, and link 130 will be operated to move the lever 132 clockwise as viewed in Figures 9 and 12. The roller 138 on the lever 132 first will act upon the rise portion of the lever 139 to rock the latter counterclockwise and pull rearwardly on the link 141, thus rocking the lever 113 and causing the roller 116 to press the tape firmly against the platen. This operation takes place during the initial depressing movement of the back spacer key 25 and before the mechanism operated by the pull rod 29 moves the carriage in the return direction. Thus, the movement of the roller 116 into tape pressing position takes place during the movement of the key 25 which is idling with respect to operation of the back spacing mechanism. After the roller 116 has been moved to tape pressing position, the cam roller 138 passes onto the dwell portion 147 of the lever 139 to maintain the roller 116 in tape pressing position. During continued depressing of the back spacer key 25, the roller 138 will ride over the dwell portion 147 of the lever 139 and the movement of the pull rod 29 will continue and will become effective to produce back spacing movement of the carriage and platen.

Pressing of the tape against the platen by the roller 116 during back spacing operation effectively connects the tape to the platen short of the printing zone. The roller 116 can turn easily and offers no appreciable resistance to return movement of the tape with respect to the frame A. On the other hand, the tape because of being pressed against the platen adjacent the roller 116 is held against sliding with respect to the platen by considerable surface friction and, therefore, is carried along with the platen in the return direction. When the back spacer key 25 is released, the connections between the key and the lever 132 will be free to permit returning of the levers 132, 139, and 113 to their starting positions under the urge of the springs 117 and 143, thus moving the roller 116 out of pressing engagement with the tape.

The cam connection between the levers 132 and 139 is such that the lever 113 may be rocked manually into tape pressing position without interference by the back spacing key 25 and associated mechanism. Thus, when the finger piece 120 is pressed rearwardly, the link 141 will move forwardly and rock the lever 139 counterclockwise as viewed in Figures 9 and 12, moving the cam rise portion away from the cam roller 138 without tending to move the lever 132 and therefore without being interfered with by the back spacer key and connecting mechanism.

To summarize the operation of the mechanism described herein, the machine is prepared for use by placing a roll 30 of tape on the hub unit 33 and positioning the flange 32 on the hub unit for supporting the roll 30. The tape is threaded between the bracket fingers 74 and 75 and thence is led over the rollers 77 and 80, thence along the printing line in front of the platen behind the roller 116, through the guides 86 and to the mechanism E where it is passed between the clamping part 102 and the heel 108 of the lever 14. The initial threading of the tape through the guides 86 may be facilitated by moving the roller 116 forwardly as may be done easily by means of the finger piece 120 on the lever 115. The spring 117 will restore the lever 115 and roller 116 to their normal positions when the finger piece is released.

During typing of a line, the tape will be clamped between the lever heel 108 and part 102 so as to be drawn along past the printing point together with the platen. Unwinding of the tape from the roll 30 will rotate the outer sleeve 51 of the hub unit 33, but the inner sleeve 50 will remain stationary until the pin 64 carried by the outer sleeve engages the pin 66 carried by the inner sleeve. Thereafter, the inner sleeve 50 will be rotated together with the outer sleeve 51 and the roll 30 so that frictional opposition to rotation of the sleeve 50 will be imposed also upon rotation of the sleeve 51 and the roll 30. Consequently drawing off of the tape will be resisted sufficiently to hold the tape taut along the printing or writing line. The spring finger 98 pressing the tape against the scale guide member 83 imposes a slight additional frictional drag on movement of the tape and holds it firmly positioned at the printing zone between the guides 86.

If, prior to the completion of its letter spacing travel, the carriage is to be back spaced manually, i. e. without operation of the back spacer key 25, the finger piece 120 is pushed rearwardly to press the roller 116 against the tape and press the tape against the platen. When the carriage is back spaced, the tape will be moved bodily in the return direction. The tape slack thus created between the roller 116 and the supply roll 30 is taken up by reverse rotation of the outer sleeve 51 and roll 30 caused by the pull of the spring 67. If the back spacing is effected by depressing the key 25, the lever 132 will be rocked in the manner previously described so as to operate the levers 139 and 113 to move the roller 116 into pressing engagement with the tape after which the carriage will be back spaced by further forward movement of the link 29.

When the line spacing lever 11 is operated to return the carriage to line starting position, the lever 114 will be rocked clockwise as viewed in Figure 8 to move the heel 108 away from the tape, thereby disconnecting the tape from the platen and permitting the tape to remain stationary while the carriage and platen are being moved in the return direction.

The mechanism disclosed herewith embodies the invention in the form now preferred, but it will be understood that changes and modifications may be made without departing from the invention as defined in the claims.

What is claimed is:

1. In a typewriter or like machine, a frame; a carriage mounted for letter spacing and return movements on said frame; a platen on said carriage; a tape supply roll; means for training tape from said supply roll along the printing line of the platen; means for connecting said tape to said platen at a point beyond the printing zone to cause said tape to travel with said platen in letter spacing direction; and means for mounting and controlling movement of said tape supply roll comprising a support fixed with respect to said frame, a first rotatable device journalled on said support, means for imposing a frictional drag on the rotation of said device; a second rotatable device carrying said roll and being journalled on said support and rotatable with respect to said first device, and a resilient coupling between said two devices for rotating said second device and said roll reversely when the feeding pull on the tape is slackened.

2. In a typewriter or like machine, a frame; a carriage mounted for letter spacing and return movements on said frame; a platen on said carriage; a tape supply roll; means for training tape from said supply roll along the printing line of the platen; means for connecting said tape to said platen at a point beyond the printing zone to cause said tape to travel with said platen in letter spacing direction; and means for mounting and controlling movement of said tape supply roll comprising a support fixed with respect to said frame, a first rotatable device journalled on said support, means for imposing a frictional drag on the rotation of said device; a second rotatable device carrying said roll and being journalled on said support and rotatable with respect to said first device, a resilient coupling between said two devices for rotating said second device and said roll reversely when the feeding pull on the tape is slackened, and means for limiting rotation of said first device with respect to said second device.

3. In a typewriter or like machine, a frame; a carriage mounted for letter spacing and return movements on said frame; a platen on said carriage; a tape supply roll; means for training tape from said supply roll along the printing line of the platen; means for drawing tape from said supply roll and feeding it along the printing line; and means for mounting and controlling movement of said tape supply roll comprising a journal pin, an inner sleeve mounted to turn about the axis of said journal pin against relatively large frictional drag, an outer sleeve mounted to turn about the axis of said pin against relatively small frictional drag, means for mounting said supply roll on said outer sleeve, and a spring interposed between said sleeves and adapted to be stressed by tape-unwinding movement of said roll and said outer sleeve.

4. In a typewriter or like machine, a frame; a carriage mounted for letter spacing and return movements on said frame; a platen on said carriage; a tape supply roll; means for training tape from said supply roll along the printing line of the platen; means for drawing tape from said supply roll and feeding it along the printing line; and means for mounting and controlling movement of said tape supply roll comprising a journal pin, an inner sleeve mounted to turn about the axis of said journal pin against relatively large frictional drag, an outer sleeve mounted to turn about the axis of said pin independently of and relatively to said inner sleeve and against relatively small frictional drag, stop means for limiting turning of said outer sleeve relatively to said inner sleeve, means mounting said supply roll on said outer sleeve, and a spring interposed between said sleeves and tending to turn said outer sleeve oppositely to the direction of tape unwinding rotation of said roll.

5. For a typewriter or like machine, a tape supply roll; and means for mounting and controlling movement of said tape supply roll comprising a journal pin, an inner sleeve mounted to turn about the axis of said journal pin against relatively large frictional drag, another sleeve mounted to turn about the axis of said pin against relatively small frictional drag, means for mounting said supply roll on said outer sleeve, and a spring interposed between said sleeves and adapted to be stressed by tape-unwinding movement of said roll and said outer sleeve.

6. In a typewriter or like machine, a frame; a carriage mounted for letter spacing and return movements on said frame; a platen on said carriage; a tape supply roll; means for training ribbon from said supply roll to extend along the writing line of the platen; means operable upon said tape at a point beyond the printing zone to cause said tape to be fed in letter spacing direction simultaneously with letter spacing movement of the platen and to be moved in return direction simultaneously with back spacing movement of the platen; and means for mounting and controlling movement of said supply roll comprising a support fixed with respect to said frame, a first rotatable device journalled on said support, means for imposing a frictional drag on the rotation of said device; a second rotatable device carrying said roll and being journalled on said support and rotatable with respect to said first device, and a resilient coupling between said two devices for rotating said second device and said roll reversely when the feeding pull on the tape is slackened.

7. In a typewriter or like machine, a frame; a carriage mounted for letter spacing and return movements on said frame; a platen on said carriage; a tape supply; means for training tape from said supply to extend along the writing line of said platen; means for connecting said tape to said platen at a point beyond the printing zone to cause said tape to travel with said platen in letter spacing direction; and means for connecting said tape to said platen at a point short of the printing zone to cause said tape to travel with said platen during back spacing movement of said platen.

8. In a typewriter or like machine, a frame; a carriage mounted for letter spacing and return movements on said frame; a platen on said carriage; a tape supply; means for training tape from said supply to extend along the writing line of said platen; means for connecting said tape to said platen at a point beyond the printing zone to cause said tape to travel with said platen in letter spacing direction; means for back spacing said carriage and platen; and means operable in response to operation of the back-spacing means for connecting said tape to said platen at a point short of the printing zone to cause said tape to travel with said platen during back spacing movement thereof.

9. In a typewriter or like machine, a frame; a carriage mounted for letter spacing and return movements on said frame; a platen on said carriage; a tape supply; means for training tape from said supply to extend along the writing line of the platen; means operable upon said tape at a point beyond the printing zone to cause said tape to be fed in letter spacing direction simultaneously with letter spacing movement of the platen and to be moved in return direction simultaneously with back spacing movement of the platen; a presser element; means mounting said presser element adjacent the tape extending along the writing line and normally out of pressing engagement with the tape, and means for moving said presser element to press the tape against the platen during back spacing of the carriage.

10. In a typewriter or like machine, a frame; a carriage mounted for letter spacing and return movements on said frame; a platen on said carriage; a tape supply; means for training tape from said supply to extend along the writing line of the platen; means operable upon said tape at a point beyond the printing zone to cause said tape to be fed in letter spacing direction simultaneously with letter spacing movement of the platen and to be moved in return direction simultaneously with back spacing movement of the platen; a presser element; a roller carried by said presser element; means mounting said presser element on said frame adjacent the tape extending along the writing line and normally out of pressing engagement with the tape, and means for moving said presser element and said roller to cause the roller to press the tape against the platen during back-spacing movement of the carriage to thereby prevent the tape from buckling.

11. In a typewriter or like machine, a frame; a carriage mounted for letter spacing and return movements on said frame; a platen on said carriage; a tape supply; means for training tape from said supply to extend along the writing line of said platen; means for connecting said tape to said platen at a point beyond the printing zone to cause said tape to travel with said platen in letter spacing direction and for back spacing movement in the return direction; a presser element; means mounting said presser element on said frame adjacent the tape extending along the writing line at a point short of the printing zone and normally out of pressing engagement with said tape; and means for moving said presser element to press the tape against the platen during back spacing of the carriage.

12. In a typewriter or like machine, a frame; a carriage mounted for letter spacing and return movements on said frame; a platen on said carriage; a tape supply; means for training ribbon from said supply to extend along the writing line of the platen; means operable upon said tape at a point beyond the printing zone to cause said tape to be fed in letter spacing direction simultaneously with letter spacing movement of the platen and to be moved in return direction simultaneously with back spacing movement of the platen; means for back spacing said carriage; a presser element; means mounting said presser element adjacent the tape extending along the writing line at a point short of the printing zone and normally out of pressing engagement with the tape; and means operable in response to operation of said carriage back-spacing means for moving said presser element to press the tape against the platen.

13. In a typewriter or like machine, a frame; a carriage mounted for letter spacing and return movements on said frame; a platen on said carriage; a tape supply; means for training tape from said supply to extend along the writing line of said platen; means for connecting said tape to said platen at a point beyond the printing zone to cause said tape to travel with said platen in letter spacing direction and for back spacing movement in the return direction; means for back-spacing said carriage; a presser element; means mounting said presser element on said frame adjacent the tape extending along the writing line at a point short of the printing zone and normally out of pressing engagement with said tape; and means operable in response to operation of said carriage back spacing means for moving said presser element to press the tape against the platen.

14. In a typewriter or like machine, a frame; a carriage mounted for letter spacing and return movements on said frame; a platen on said carriage; a tape supply; means for training tape from said supply to extend along the writing line of said platen; means for connecting said tape to said platen at a point beyond the printing zone to cause said tape to travel with said platen in letter spacing direction and for back spacing movement in the return direction; means for back-spacing said carriage including a key and a part adapted to have a preliminary idling movement upon actuation of said key; a presser element; means mounting said presser element on said frame adjacent the tape extending along the writing line at a point short of the printing zone and normally out of pressing engagement with the tape; and means operable in response to idling movement of said part for moving said presser element to press the tape against the platen and effective during further movement of said part for maintaining the tape pressed against the platen during back spacing of said carriage.

15. In a typewriter or like machine, a frame; a carriage mounted for letter spacing and return movements on said frame; a platen on said carriage; a tape supply; means for training tape from said supply to extend along the writing line of said platen; means for connecting said tape to said platen at a point beyond the printing zone to cause said tape to travel with said platen in letter spacing direction and for back spacing movement in the return direction; means for back-spacing said carriage including a key and a part adapted to have a preliminary idling movement upon actuation of said key; a presser element; means mounting said presser element on said frame adjacent the tape extending along the writing line at a point short of the printing zone and normally out of pressing engagement with the tape; and cam means operable in response to idling movement of said part for moving said presser element to press the tape against the platen and effective during further movement of said part for maintaining the tape pressed against the platen during back spacing of said carriage, said cam means including a cam element and cooperating element, the cam element having a rise portion for actuating said cooperating element and thus moving said presser element to press the tape against the platen during idling movement of said part and a dwell portion for maintaining said cooperating element in position to hold said presser element in tape pressing position during the further movement of said part which effects carriage backspacing.

16. In a typewriter or like machine, a frame; a carriage mounted for letter spacing and return movements on said frame; a platen on said carriage; a tape supply; means for training tape from said supply to extend along the writing line of said platen; means for connecting said tape to said platen at a point beyond the printing zone to cause said tape to travel with said platen in letter spacing direction and for back spacing movement in the return direction; means for applying retracting force to said tape at a point short of the printing zone, whereby when the carriage is back spaced with the tape still connected to the platen the tape extending across the printing zone will be moved bodily in the return direction; means for back-spacing said carriage; a presser element; means mounting said presser element on said frame adjacent the tape extending along the writing line and between the printing zone and said retacting-force-applying means and normally out of pressing engagement with said tape; and means operable in response to operation of said back-spacing means for moving said presser element to press said tape against said platen.

17. In a typewriter or like machine, a frame; a carriage mounted for letter spacing and return movements on said frame; a platen on said carriage; a tape supply; means for training tape from said supply to extend along the writing line of said platen; means for connecting said tape to said platen at a point beyond the printing zone to cause said tape to travel with said platen in letter spacing direction; means for back-spacing said carriage including a manually manipulatable key; normally ineffective means adapted when moved to connect the tape to the platen short of the writing zone; means including a one-way drive device for transmitting movement from said key to said normally ineffective means in response to operation of said key but not vice-versa; and means for rendering said normally ineffective means effective independently of operation of said key.

18. In a typewriter or like machine, a main frame; a platen mounted on said frame for endwise reciprocatory travel; key lever and associated mechanism mounted on said main frame; a tape supply roll whose diameter is less than the minimum horizontal dimension of said main frame; means journalling said supply roll to rotate in a substantially horizontal plane on said frame underneath said key lever and associated mechanism and with said supply roll located entirely within the main frame margin; means on said frame for guiding tape from said roll to extend horizontally and outwardly toward an end of the frame, then upwardly adjacent an end of the frame, and then horizontally along the printing line of the platen; and means for feeding said tape along the printing line.

19. In a typewriter or like machine, a main frame; a platen mounted on said frame for endwise reciprocatory travel; key lever and associated mechanism mounted on said main frame; a tape supply roll whose diameter is less than the minimum horizontal dimension of said main frame; means journalling said supply roll to rotate in a substantially horizontal plane on said frame underneath said key lever and associated mechanism and with said supply roll located entirely within the main frame margin; means on said frame for guiding tape from said roll to extend horizontally and outwardly beyond an end wall of the frame, then upwardly adjacent the outside of said end wall, and then along the printing line of the platen; a guard for covering the upwardly extending portion of the tape; and means for feeding said tape along the printing line.

20. In a typewriter or like machine, a main frame; a platen mounted on said frame for endwise reciprocatory travel; key lever and associated mechanism mounted on said main frame; legs connected to the bottom of said main frame and extending downwardly for engagement with a support to maintain the main frame vertically spaced above the support and thereby providing a clearance space between the support and said main frame; a horizontally disposed supplemental frame carried by said main frame and in said clearance space; a tape supply carried by said supplemental frame; and means for guiding tape from said supply to extend clear of said mechanism up to the level of and along the writing line of the platen.

21. In a typewriter or like machine, a main frame; a platen mounted on said frame for endwise reciprocatory travel; key lever and associated mechanism mounted on said main frame, said frame being adapted to rest upon a supporting surface with limited vertical clearance between said surface and said mechanism; a tape supply adapted to be positioned under said mechanism but of such vertical dimension as to not fit in said limited vertical clearance; extension legs connected to said main frame and projecting downwardly therefrom to engage the supporting surface and thereby support said main frame and mechanism above said surface with increased vertical clearance; means for mounting said tape supply in the space provided by said increased vertical clearance; and means for guiding tape from said supply to extend clear of said mechanism up to the level of and along the writing line of the platen.

22. In a typewriter or like machine, a frame; a carriage mounted for letter spacing and return movements on said frame; a platen on said carriage; a tape supply; means for training tape from said supply to extend along the printing line of said platen; means beyond the printing zone for feeding the tape in letter spacing direction; and means on said frame pressing against said tape short of and immediately adjacent the printing zone for frictionally opposing feeding of the tape.

23. In a typewriter or like machine, a frame; a carriage mounted for letter spacing and return movements on said frame; a platen on said carriage; a tape supply; means for training tape from said supply to extend along the printing line of said platen; means beyond the printing zone for feeding the tape in letter spacing direction; a part fixed with respect to said frame short of and adjacent the printing zone; and a spring finger on said frame for resiliently pressing said tape against said part to thereby frictionally oppose feeding of the tape.

24. In a typewriter or like machine, a frame; a carriage mounted for letter spacing and return movements on said frame; a platen on said carriage; a tape supply; means for training tape from said supply to extend along the writing line of the platen; means operable upon said tape at a point beyond the printing zone to cause said tape to be fed in letter spacing direction simultaneously with letter spacing movement of the platen and to be moved in return direction simultaneously with back spacing movement of the platen; a presser element; a roller carried by said presser element; means mounting said presser element on said frame adjacent the tape extending along the writing line and normally out of pressing engagement with the tape, and means for selectively moving said presser element and said roller to cause the roller to press the tape against the platen during back-spacing movement of the carriage to thereby prevent the tape from buckling or to move said presser element and said roller to positions farther from the platen than the normal positions of said element and roller to thereby facilitate placing of the tape along the writing line, said presser element-moving means comprising a finger piece.

MATILDA J. HANDLEY,
*Executrix of George F. Handley, Deceased.*